UNITED STATES PATENT OFFICE.

GUY STERLING, OF SALT LAKE CITY, UTAH.

PROCESS OF SEPARATING POTASSIUM SALTS FROM MOTHER-LIQUOR SALTS.

1,264,572.   Specification of Letters Patent.   Patented Apr. 30, 1918.

No Drawing.   Application filed September 17, 1917. Serial No. 191,846.

*To all whom it may concern:*

Be it known that I, GUY STERLING, a citizen of the United States, residing at Salt Lake City, in the county of Salt Lake and State of Utah, have invented certain new and useful Improvements in Processes of Separating Potassium Salts from Mother-Liquor Salts; and I hereby declare that the following is a full, clear, and exact description thereof.

This invention is a novel process of treating mother liquor salts, containing potassium salts in a soluble form, obtained (after crystallizing out as much as practicable of the common salt) from natural brines, such as sea water or water of salt lakes such as Salt Lake, Utah, or of salt wells and springs, to recover such potassium salts.

In addition to a reduced proportion of common salt, such mother liquor salts contain chlorids of magnesium and potassium, and sulfates of sodium, magnesium and potassium; of these the potassium salts form a small proportion and are valuable, but the separation of such potassium salts from the mother liquor salts, by the usual methods of fractional crystallization, is both difficult and expensive.

In mother liquor salts containing as one ingredient a potassium salt, (such as $K_2SO_4$ or KCl) the potassium salt is already in a soluble form and there is no necessity for chemically changing its form. But the proportion of potassium salt contained in such mother liquor salt is so small that unless the potassium salt, in a concentrated or purified condition, can be separated from the mother liquor salts such potassium salts is unavailable for practical use.

It is the object of this invention to obtain from mother liquor salts either pure potassium salts or a mixture of salts relatively rich in potassium salts; or, in other words, to separate from mother liquor salts containing potassium salts the potassium salts alone or relatively free from the other mother liquor salts.

I have discovered that if to mother liquor salts of the character described, silica and limestone are added, and the whole finely powdered, and intimately mixed and heated, preferably with stirring, to about 1400° C. for three or four hours, the whole of the potassium salts and the sodium chlorid contained in the mother liquor salts are sublimed; and at the same time the sodium of the sodium sulfate, and the magnesium of the magnesium chlorid and of the magnesium sulfate, (if contained in the mother liquor salts,) along with the calcium of the limestone, combines with the silica to form a sodium-calcium-magnesium-silicate.

For example, such mother liquor salts would contain,—

Sodium chlorid     = NaCl (common salt),
Sodium sulfate     = $Na_2SO_4$,
Magnesium chlorid  = $MgCl_2$,
Potassium chlorid  = KCl.

When such mother liquor salts are mixed with silica and limestone in proper proportions, pulverized and properly heated in a suitable furnace, as stated, the sodium of the sodium sulfate, the magnesium of the magnesium chlorid and the calcium of the limestone will combine chemically with the silica, forming a sodium-calcium-magnesium-silicate, and at the same time the KCl; NaCl, the $SO_3$ of the sodium sulfate, the $Cl_2$ of the magnesium chlorid and the $CO_2$ of the limestone,—separate from the residue; the KCl and NaCl in sublimed form, and the $SO_3$= (+$SO_2O$), the $Cl_2$ and $CO_2$ in gaseous form.

The sublimed KCl and NaCl are separated and precipitated from the gases by suitable means and saved. Thus I obtain a mixture of KCl and NaCl which, as compared to the mother liquor salts, is relatively rich in potassium salts, and from this mixture of KCl and NaCl it is relatively easier and economically practicable to separate the KCl by ordinary methods of fractional crystallization.

One practical mode of carrying out my process is to take about 0.8 parts by weight of such mother liquor salts, 0.50 parts of silica (or any rock containing an equivalent amount of silica) and 0.85 parts of limestone, thoroughly comminute and intimately mix them, and then heat the mass in a suitable furnace to a temperature of approximately 1400 degrees C. for a period of about three hours, preferably mechanically stirring the mass while subjected to the heat, then condensing by suitable means the sublimed salts producing a mixture of potassium salts and sodium chlorid relatively rich in potassium salts and free from magnesium salts or sodium salts other than sodium chlorid.

Any suitable mechanical apparatus may be employed in carrying out the process.

By this method of treatment I separate from mother liquor salts, in a sublimed form, all of the potassium salts and the sodium chlorid; and by condensing the sublimed salts I obtain a mixture of potassium salts and sodium chlorid (relatively rich in potassium salts and free from sodium sulfate and magnesium salts) which may be used directly in the manufacture of fertilizers or from which the potassium salts may, at relatively small expense, be separated in the usual or preferred manner.

In this process the silica is the essential reagent, acting as a nucleus with which the sodium, calcium and magnesium combine. Without the silica, there would be no reaction. The limestone is used because, under the proportions and conditions stated, it retards the chemical combination of the potassium with the silica and at the same time induces the sublimation of the potassium salts before they are decomposed by the silica.

If the mother liquor salts and silica, without limestone, were heated to the point of reaction there would be formed a potassium-sodium-magnesium-silicate, and a large part if not all of the potassium contained in the salts would go into chemical combination with the silica and become unavailable, in spite of the fact that potassium salts are generally more easily sublimed than most sodium salts.

It is of course obvious that a natural silicate, whether containing potassium or not, may (on account of its contained silica) be used instead of pure silica.

I claim:

1. The process of extracting potassium salts from mother liquor salts obtained from salt brines, consisting in mixing mother liquor salt, silica and limestone, and heating same until the magnesium and the sodium of the sodium sulfate contained in the mother liquor salts and the calcium of the limestone chemically combine with the silica, subliming the potassium salts and the sodium chlorid, and condensing the sublimed salts, producing a mixture relatively rich in potassium salts.

2. The process of extracting potassium salts from mother liquor salts obtained from salt brines, consisting in heating, with stirring, a suitably proportioned, finely powdered and intimately mixed mixture of mother liquor salt, silica and limestone; until the magnesium and the sodium of the sodium sulfate contained in the mother liquor salts and the calcium of the limestone chemically combine with the silica; subliming the potassium salts and the sodium chlorid; and condensing by suitable means the sublimed salts, producing a mixture relatively rich in potassium salts.

3. The process of extracting potassium salts from mother liquor salts obtained from salt brines, consisting in heating, with stirring, a suitably proportioned, finely ground and intimately mixed mixture of mother liquor salt, a silicate and limestone, combining chemically the magnesium and the sodium of the sodium sulfate contained in the mother liquor salts with the silicate, subliming the potassium salts and that part of the sodium salts remaining uncombined with the silicate, condensing by suitable means the sublimed salts, producing a mixture of potassium and sodium salts relatively rich in potassium salts free from magnesium salts.

4. The process of extracting potassium salts from mother liquor salts obtained from salt brines, consisting in heating, with stirring, a suitably proportioned, finely ground and intimately mixed mixture of mother liquor salt, a potassium bearing silicate and limestone, combining chemically the magnesium and the sodium of the sodium sulfate contained in the mother liquor salt, subliming the potassium salts and that part of the sodium salts remaining uncombined with the silicate, converting the insoluble potassium of the silicate into a soluble potassium salt, subliming also the latter, and condensing by suitable means the sublimed salts, thereby producing a mixture of potassium and sodium salts relatively rich in potassium salts and free from magnesium salts.

In testimony that I claim the foregoing as my own, I affix my signature.

GUY STERLING.